(12) United States Patent
Hong et al.

(10) Patent No.: US 12,546,725 B2
(45) Date of Patent: Feb. 10, 2026

(54) INSPECTION METHOD FOR LITHIUM SECONDARY BATTERY

(71) Applicant: LG ENERGY SOLUTION, LTD., Seoul (KR)

(72) Inventors: Seung Gyun Hong, Daejeon (KR); Jong Myung Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 556 days.

(21) Appl. No.: 18/023,940

(22) PCT Filed: Jul. 19, 2021

(86) PCT No.: PCT/KR2021/009281
§ 371 (c)(1),
(2) Date: Feb. 28, 2023

(87) PCT Pub. No.: WO2022/059898
PCT Pub. Date: Mar. 24, 2022

(65) Prior Publication Data
US 2023/0327222 A1    Oct. 12, 2023

(30) Foreign Application Priority Data
Sep. 18, 2020 (KR) .................. 10-2020-0120405

(51) Int. Cl.
*G01N 21/88* (2006.01)
*G06T 7/00* (2017.01)
(Continued)

(52) U.S. Cl.
CPC ....... *G01N 21/8851* (2013.01); *G06T 7/0008* (2013.01); *G06T 7/001* (2013.01); *G06T 7/11* (2017.01); *G06V 10/764* (2022.01); *H01M 10/4228* (2013.01); *H01M 10/4285* (2013.01); *G06T 2207/20084* (2013.01)

(58) Field of Classification Search
CPC ....... G01N 21/8851; G01N 2021/8883; G01N 2021/8854; G01N 2021/8887; G06T 7/0008; G06T 7/001; G06T 7/11; G06T 2207/20084; G06T 2207/20081; G06T 2207/30164; G06T 7/0004; G06V 10/764; H01M 10/4228; H01M 10/4285; H01M 10/04; H01M 10/0525; H01M 10/42;
(Continued)

(56) References Cited

FOREIGN PATENT DOCUMENTS

| CN | 109598721 A | 4/2019 |
| CN | 109919908 A | 6/2019 |

(Continued)

OTHER PUBLICATIONS

CN108355987 Li et al, machine translated (Year: 2018).*

(Continued)

*Primary Examiner* — Jianxun Yang
(74) *Attorney, Agent, or Firm* — Birch, Stewart, Kolasch & Birch, LLP

(57) ABSTRACT

An inspection method for a lithium secondary battery can improve the reliability, accuracy, and reproducibility of inspection results by advancing a learning of an artificial neural network according to one or more divided regions of one or more surfaces of the lithium secondary battery and one or more types of defects occurring in each region.

13 Claims, 2 Drawing Sheets

(51) Int. Cl.
*G06T 7/11* (2017.01)
*G06V 10/764* (2022.01)
*H01M 10/42* (2006.01)

(58) Field of Classification Search
CPC .......... G06N 3/0464; G06N 3/09; G06N 3/08; Y02E 60/10
See application file for complete search history.

(56) References Cited

FOREIGN PATENT DOCUMENTS

| | | | |
|---|---|---|---|
| CN | 110044921 A | 7/2019 | |
| CN | 110441316 A | 11/2019 | |
| CN | 111105405 A | 5/2020 | |
| KR | 10-1030449 B1 | 4/2011 | |
| KR | 10-1678771 B1 | 11/2016 | |
| KR | 10-2019-0023146 A | 3/2019 | |
| KR | 10-2019-0075707 A | 7/2019 | |
| KR | 10-2020-0103150 A | 9/2020 | |

OTHER PUBLICATIONS

Detection and Segmentation, Ferguson et al 2018 (Year: 2018).*
Badmos et al., "Image-Based Defect Detection in Lithium-Ion Battery Electrode Using Convolutional Neural Networks," Journal of Intelligent Manufacturing, vol. 31, No. 4, Aug. 1, 2019, XP037083271, pp. 885-897.
Extended European Search Report for European Application No. 21869522.9, dated May 16, 2025.
Haddad et al., "Locally Adaptive Statistical Background Modeling with Deep Learning-Based False Positive Rejection for Defect Detection in Semiconductor Units," Transactions on Semiconductor Manufacturing, IEEE, vol. 33, No. 3, May 27, 2020, XP011803067, pp. 357-372.
International Search Report (PCT/ISA/210), issued in PCT/KR2021/009281, dated Nov. 4, 2021.

* cited by examiner

INSPECTION METHOD FOR LITHIUM SECONDARY BATTERY

CROSS REFERENCE WITH RELATED APPLICATION(S)

This application claims the benefit of Korean Patent Application No. 10-2020-0120405 filed on Sep. 18, 2020 with the Korean Intellectual Property Office, the disclosure of which is incorporated herein by reference in its entirety.

TECHNICAL FIELD

The present disclosure relates to an inspection method for a lithium secondary battery, and more particularly to an inspection method for a lithium secondary battery that can improve the reliability, accuracy and reproducibility of inspection results by advancing the artificial neural network learning according to each divided region and the type of defects occurring in each region.

BACKGROUND

Recently, it has been seriously desired to reduce carbon dioxide emission in order to cope with air pollution and global warming. In the automobile industry, there are increasing hopes that introduction of electric vehicles (EV), hybrid electric vehicles (HEV) and the like will reduce carbon dioxide emission. In order to put these vehicles into practical use, development and commercialization of lithium secondary batteries are actively made.

Such as lithium secondary battery is subjected to appearance inspection to remove defective products after the manufacturing and activation steps are completed. In the process of such appearance inspection, it is inspected whether a number of defects, such as dent defects, electrolyte leakage and injection defects, sink defects, scratch defects, surface contamination and washer defects are occurred according to each outer surface and each region of the lithium secondary battery.

Recently, in response to an increasing demand for improvement of mass productivity of lithium secondary batteries, many attempts have been made to introduce an automatic inspection equipment for appearance inspection of the lithium secondary battery. However, there are a large number of types of defects that need to be inspected in the process of the appearance inspection, and the type of defects that mainly occur for each outer surface and region of the lithium secondary battery also differ. Thus, it is true that the reliability and accuracy of the automated inspection equipment was quite low. For example, according to the accumulated data that the present inventors confirmed the accuracy of the automatic inspection equipment from 2010 to 2015, it was confirmed that after performing an appearance inspection for the lithium secondary battery using the automatic inspection equipment, the reliability and accuracy of the inspection are very low in such a manner that the defect detection rate reaches about 4.1% and the defect detection rate of the battery that is not actually defective, that is, the excessive detection rate reaches about 46.6%.

Due to these problems, the appearance inspection of the lithium secondary battery is being carried out in a direction that complements the problem of the automatic inspection equipment. More specifically, recently, the low accuracy and reliability of the automatic inspection equipment are being compensated in a way that an actual inspector verifies and monitors the image data for each outer surface of the lithium secondary battery.

However, these methods also vary greatly in the accuracy and reliability of the inspection results depending on the inspectors experience and degree of fatigue, and also have a significant adverse effect on the mass productivity of the lithium secondary battery and the cost of the process.

Therefore, there is a continuous demand for the development of a method capable of performing the appearance inspection for the lithium secondary battery with higher reliability and accuracy without impairing the mass productivity of the lithium secondary battery.

Technical Problem

The present disclosure provides an inspection method for a lithium secondary battery that can improve the reliability, accuracy and reproducibility of the inspection results using artificial neural network technique.

Technical Solution

According to one embodiment of the present disclosure, there is provided an inspection method for a lithium secondary battery comprising:

a first step of determining a plurality of surfaces of the lithium secondary battery for performing an appearance inspection, dividing each of the plurality of surfaces into one or more regions for one or more types of defects to be detected and accumulating first image data for each region of the one or more regions;

a second step of constructing a second image data including existing image data in which normal or defective is confirmed according to the one or more types of defects occurring in each region;

a third step of comparing the first and second image data with each other in an artificial neural network to first judge whether the lithium secondary battery is normal or defective as a first judgment result;

a fourth step of judging defect detection or erroneous detection from the first judgement result as a second judgment result, and feeding back the second judgement result to cause the artificial neural network to learn;

a fifth step of determining a third image data in which standards for normal or defect are set and classified based on feeding back of the second judgment result; and a sixth step of comparing the first image data for each region of the lithium secondary battery to be inspected with the third image data to judge whether the lithium secondary battery to be inspected is normal or defective.

Advantageous Effects

The present disclosure provides a method of inspecting a lithium secondary battery that can improve the accuracy, reliability, and reproducibility of the appearance inspection of a lithium secondary battery using an automatic inspection equipment through an artificial neural network learning.

According to this inspection method, it was confirmed that even if automatic inspection equipment without an actual inspector is applied, the defect detection rate and excessive detection rate of the inspection result can be greatly reduced to about 0.01% or less and about 10% or less.

In particular, in the inspection method of the present disclosure, image data divided for each region of the lithium secondary battery is formed, and as the separate artificial neural network learning and inspection are performed according to the type of defects mainly occurring in each region, the reliability and accuracy of the inspection result can be further improved, and also the artificial nerve network learning and inspection process can be made more efficient, and the inspection speed can be further increased.

Therefore, the inspection method of the present disclosure can greatly contribute to the mass productivity of the lithium secondary battery and the reduction of the defect rate thereof.

DETAILED DESCRIPTION OF THE EMBODIMENTS

Terms such as first, second, and the like may be used to describe various components and the terms are used only to discriminate one constituent element from another component.

Also, the terminology used herein is for the purpose of describing particular embodiments only and is not intended to be limiting. As used herein, the singular forms "an" and "the" are intended to include the plural forms as well, unless the context clearly indicates otherwise. It will be further understood that the terms "comprise", "include", "have", etc. as used herein, specify the presence of stated features, integers, steps, elements, components, and/or combinations of them but do not preclude the presence or addition of one or more other features, integers, steps, elements, components, and/or combinations thereof.

While the present invention may be modified in various ways and take on various alternative forms, specific embodiments thereof are shown and described in detail below. However, it should be understood that there is no intent to limit the present disclosure to the particular forms disclosed, but on the contrary, the present invention covers all modifications, equivalents, and alternatives falling within the spirit and scope of the present disclosure.

Figure 1:
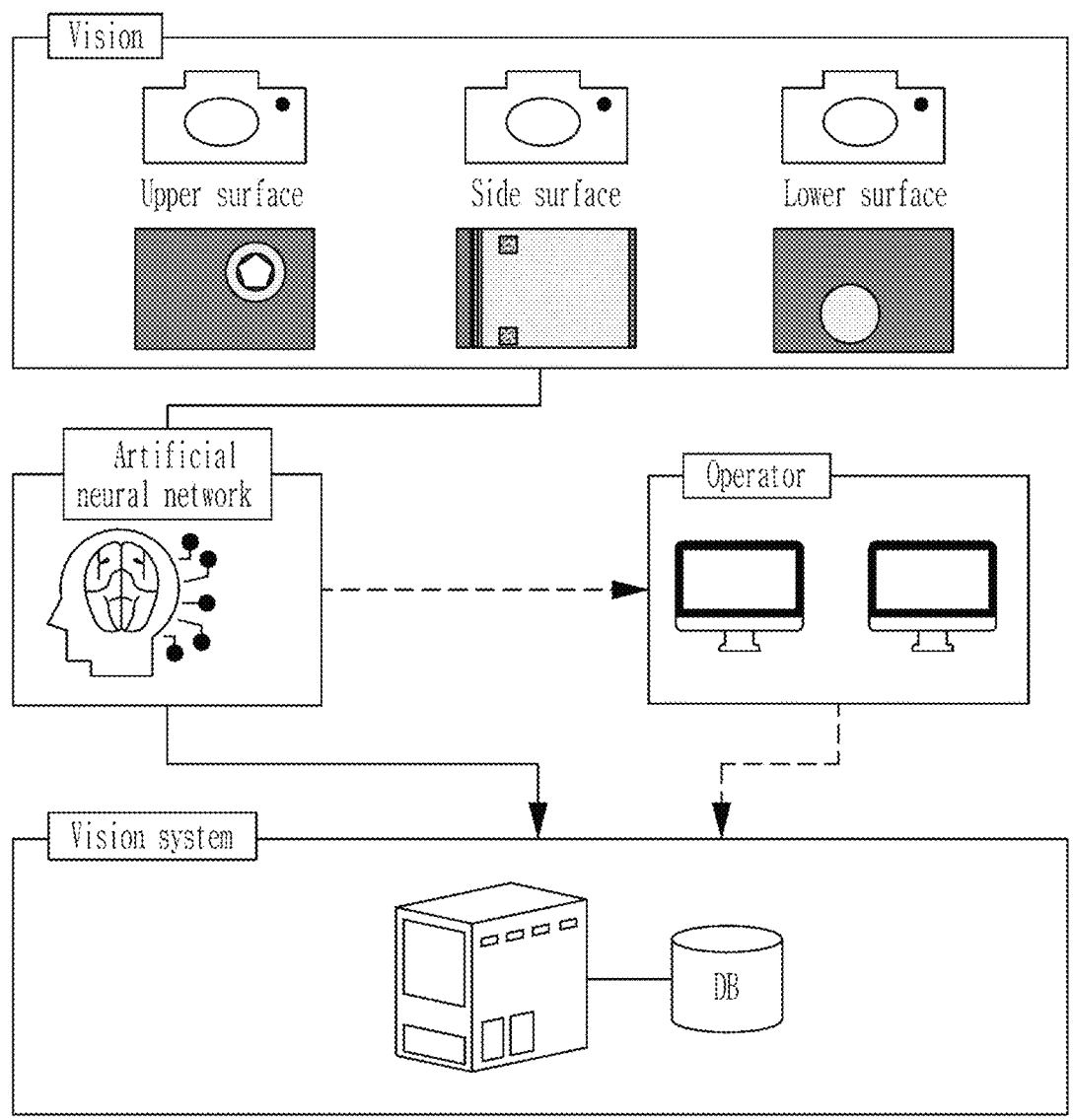
FIG. 1 is a simplified schematic diagram showing the inspection system and inspection process of a lithium secondary battery in which the inspection method of one embodiment is performed.
Figure 2:
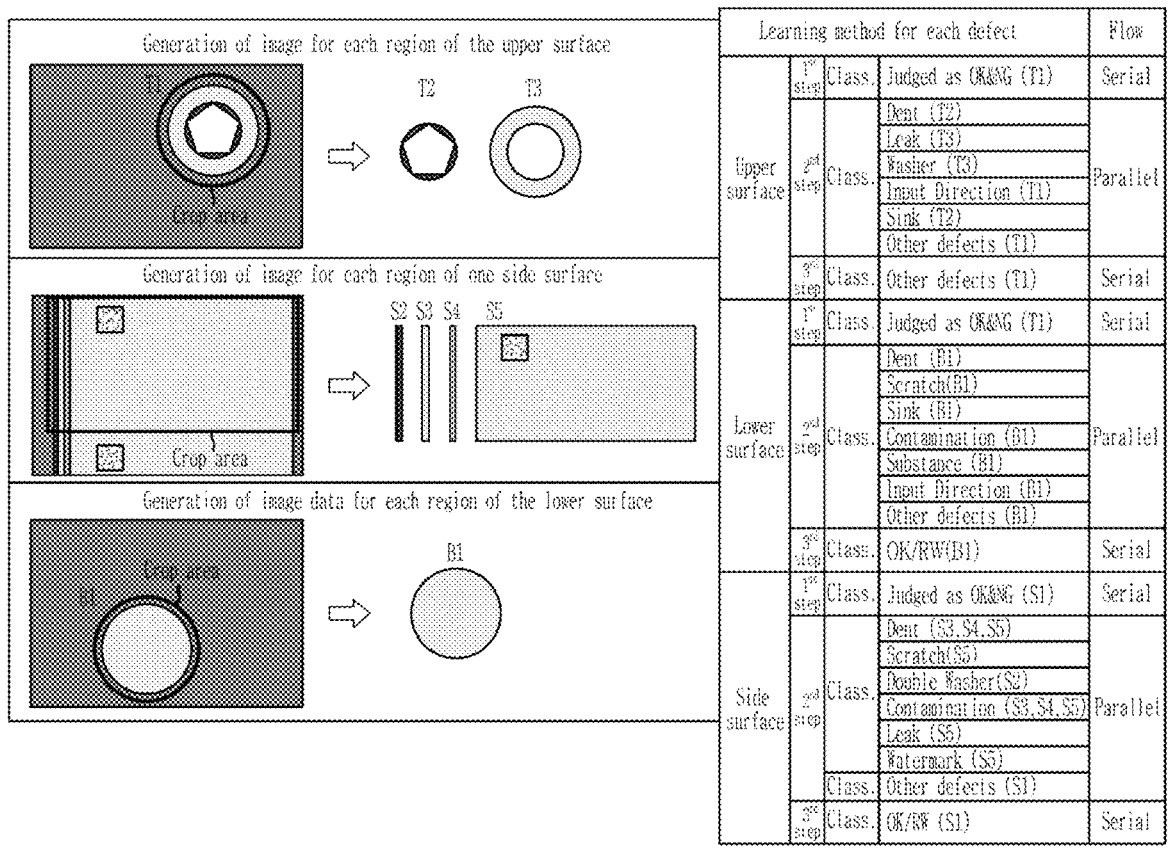
FIG. 2 schematically shows, in the inspection method according to one embodiment, a process of generating an image data split and divided for each region, and performs artificial neural network learning and inspection about the presence/absence of occurrence of a defect occurring mainly in each region.

Hereinafter, the inspection method for a lithium secondary battery according to the embodiment will be described with reference to the accompanying drawings. FIG. 1 is a simplified schematic diagram showing the inspection system and inspection process of a lithium secondary battery in which the inspection method of one embodiment is performed. FIG. 2 schematically shows, in the inspection method according to one embodiment, a process of generating an image data split and divided for each region, and performs artificial neural network learning and inspection about the presence/absence of occurrence of a defect occurring mainly in each region.

According to an embodiment of the present disclosure, there is provided an inspection method for a lithium secondary battery comprising:

a first step of determining a plurality of surfaces for performing an appearance inspection of manufactured and activated lithium secondary battery, dividing each of the plurality of surfaces into one or more regions for each type of defects and accumulating first image data for each of these regions;

a second step of constructing a second image data including existing image data in which normal or defective is confirmed according to the type of defects occurring in each region;

a third step of comparing the first and second image data with each other in an artificial neural network to first judging whether the lithium secondary battery is normal or defective;

a fourth step of judging defect detection or erroneous detection from the first judgement result, and feeding back the judgement result to make the artificial neural network learn;

a fifth step of determining a third image data in which standards for normal or defect are set and classified based on the learning result; and a sixth step of comparing the image data for each region of the lithium secondary battery to be inspected with the third image data to determine whether the lithium secondary battery to be inspected is normal or defective.

The present inventors continued to study to further improve the learning and data processing process and speed of the artificial neural network while further improving the accuracy, reliability, and reproducibility of an appearance inspection of the lithium secondary battery by using the artificial neural network technique.

As a result of these studies, the inventors divided the types of defects that should be mainly confirmed during the appearance inspection of the lithium secondary battery according to the regions where they mainly occur, and divided the plurality of outer surfaces of the lithium secondary battery according to the region and the types of defects that mainly occurs in each region, thereby constructing a database.

Based on these databases, the plurality of outer surfaces were again divided for each region to construct first image data divided and generated for every region. In addition, in consideration of the types of defects that mainly occur in each region, second image data including image data in which normal or defective was previously confirmed for each type of defects was constructed, and artificial neural network learning was performed through mutual comparison between the first and second image data and a feedback process.

As such, based on the image data divided for each region, as artificial neural network learning is performed by specifying the types of defects that mainly occur in each region, it greatly improved the data processing process and speed within artificial neural networks.

In addition, after the artificial neural network learning, the third image data as an inspection standard was determined based on these learning results. Based on the third image data, the appearance inspection of the lithium secondary battery was automatically performed by comparing the image data for each region of the lithium secondary battery to be inspected.

In accordance with the automatic performance of the appearance inspection of the batteries that have undergone such artificial neural network learning, it was confirmed that the accuracy, reliability and reproducibility of the appearance inspection of the lithium secondary batteries using automatic inspection equipment can be greatly improved. In particular, the present inventors have accumulated data by internally performing this inspection method, and as a result, confirmed that even when automatic inspection equipment without an actual inspector is applied, the defect detection rate and excessive detection rate of the inspection results are reduced to about 0.01% or less (specifically, about 0.0016%) and about 10% or less (specifically, about 7.37%), and thus, the reliability, accuracy and reproducibility of the appearance inspection of the lithium secondary battery can be greatly improved.

Therefore, even if the appearance inspection of the lithium secondary battery is performed through automatic inspection, the inspection method of one embodiment can significantly increase the reliability and accuracy of the inspection result, and also can perform the artificial neural network learning and inspection process with high efficiency, and further increase the inspection speed. Therefore, this method can greatly contribute to the improvement of the mass productivity of the lithium secondary battery and the reduction of the process cost.

The inspection method of the one embodiment of the disclosure will be explained concretely for each step as follows.

First, in the method of the one embodiment, a plurality of surfaces for performing an appearance inspection of manufactured and activated lithium secondary battery is determined, and each of the plurality of surfaces are divided into one or more regions for each type of defects to accumulate first image data for each of these regions.

For example, when the lithium secondary battery is formed of a cylindrical, prismatic, or pouch-type lithium secondary battery, the plurality of surfaces may be determined as an upper surface, one side surface, and a lower surface of the lithium secondary battery.

In addition, in the first step, based on the existing appearance inspection result database, the types of defects that should be mainly confirmed during the appearance inspection of the lithium secondary battery are divided according to the regions where they mainly occur, and the first image data for each region separately split and divided for each region was generated and accumulated. In particular, with respect to the image data for each region, the region excluding the remaining regions is simplified in the form of a figure consisting of geometric lines, for example, as shown in FIG. 2. Through this, the subsequent data processing and learning process in the artificial neural network was performed with high efficiency.

In the generation and accumulation of such first mage data, each of the regions can be defined and divided by classifying the types of defects.

According to one specific embodiment, the upper surface of the lithium secondary battery can be divided into a first region (T2 in FIG. 2) in which a dent defect or the like occurs; a second region (T3 in FIG. 2) where electrolyte leakage defect, washer defect, or the like occur, and a third region (T1 in FIG. 2) where electrolyte injection defect occurs.

Further, in the lower surface of the lithium secondary battery, a fourth region (B1 in FIG. 2) where dent defects, scratch defects, sink defects, and surface contamination occur is selected, and only images for this fourth region may be selectively taken.

Further, one side surface of the lithium secondary battery is divided into a region (S1 in FIG. 2) and this region can be divided into a fifth region (S3 to S5 in FIG. 2) where a dent defect or the like occurs, and a sixth region (S2 in FIG. 2) where double washer defects or the like occur.

That is, each outer surface of the battery is divided into a plurality of regions according to the type of defects in this way, and the first image data can be accumulated by a method of taking the image data of each of these regions and simplifying the corresponding image data excluding the remaining region therefrom. For reference, image data generated and accumulated in a subsequent step may also be generated and accumulated according to the image data in which the region is divided and simplified.

Therefore, in the method of the one embodiment, the first image data may include image data corresponding to the upper surface, the lower surface, and one side surface of the lithium secondary battery, and the image data of each outer surface may include image data for each region that is selectively divided and simplified for each of the above-mentioned regions, for example, the first to third regions of the upper surface, the fourth region of one side surface, and the fifth and sixth regions of the lower surface. Further, second and third image data be described later, and image data of the battery to be inspected include the image data divided for each region as well.

Meanwhile, in the second step of the method of one embodiment, apart from the above-described first image data, considering the types of defects that mainly occur for each corresponding region, second image data including image data for each region/type of defects in which normal or defective was previously confirmed for each type of defects is constructed. The second image data may be constructed in the same manner as the first image data, except that image data in which normal or defective was confirmed for each type of defects is separately included.

Thereafter, in the third and fourth steps, the first and second image data are compared with each other to perform a first judgement as to whether a defect has occurred, and the process of learning the artificial neural network is carried out by feeding back the defect detection or erroneous detection of the first judgement result.

The type of the artificial neural network or deep learning system applicable in the method of one embodiment is not particularly limited, and any artificial neural network system known to be capable of processing and judging image data from before can be applied.

For example, the above-quoted neural network may include an input layer, an output layer, and a hidden layer. The input layer inputs the first image data, and the hidden layer compares them with the second image data and outputs the result of first judging whether it is normal or defective for each area/type of defects in the output layer.

The result of this first judgement is compared with other input image data that has already been input, or whether or not defects are undetected or erroneously detected is judged by an artificial neural network operator, and whether or not these are undetected or erroneously detected is fed back.

In this way, a first judgement is made as to whether or not a defect has occurred for each region/type of defects, and the presence/absence of an error in the first judgement result is fed back. Further, through the process of cross-referencing and feeding back the data for each region, the accuracy and reliability of the reference data for judging the presence/absence of occurrence of defects for each region/type of defects can be greatly improved. Meanwhile, in order to more efficiently proceed with the judgement of the presence/absence of occurrence of defects, and the feedback process based on the above-mentioned image data, for example, artificial neural network systems such as Convolutional Neural Network (CNN; https://elluntstory.com)/104 [Ellun's Library] or https://en.wikipedia.org/wiki/Kernel (image processing), etc.) that is specialized in learning and recognizing image data and is known to include the data processing described above, can be appropriately used.

Meanwhile, based on the results of performing artificial neural network learning in the above-mentioned third and fourth steps, the standards for normal or defective is finally set for each region and type of defects described above, and the classified third image data can be determined.

This third image data can be compared with the image data for each region of the lithium secondary battery to be inspected in the same manner as in the third step to finally determine whether the lithium secondary battery to be inspected is normal or defective. At this time, since the third image data becomes an inspection standard whose accuracy and reliability are greatly improved through the artificial neural network learning, based on this, it is possible to inspect with very high accuracy whether a defect has occurred for each region/type of defects of the lithium secondary battery to be inspected.

Meanwhile, the inspection method of the above-mentioned embodiment may be performed serially/sequentially for each of the upper surface, the lower surface, and one side surface of the lithium secondary battery, or may be performed in parallel for each of these outer surfaces at the same time. That is, by dividing the first image data constructed in the above-mentioned first step into data for each outer surface, the above-mentioned second to fourth steps can be performed sequentially or in parallel.

When the inspection of each of these outer surfaces is performed serially/sequentially, the whole inspection process can be performed more quickly, and when these inspections are performed simultaneously and in parallel, the reliability of the inspection under mutual data reference can be further improved.

In addition, as the inspection of each outer surface is performed separately, the artificial neural network can separately determining, for each outer surface, a third image data in which the standards for normal or defective with respect to one or more divided regions are set and classified, based on the learning result for each type of defects.

The invention claimed is:

1. An inspection method for a lithium secondary battery comprising:
a first step of determining a plurality of surfaces of the lithium secondary battery, for performing an appearance inspection, dividing each of the plurality of surfaces into one or more regions for one or more types of defects to be detected and accumulating first image data for each region of the one or more regions;
a second step of constructing a second image data including existing image data in which normal or defective is confirmed according to the one or more types of defects occurring in each region;
a third step of comparing the first and second image data with each other in an artificial neural network to first judge whether the lithium secondary battery is normal or defective as a first judgment result;
a fourth step of judging defect detection or erroneous detection from the first judgement result as a second judgment result, and feeding back the second judgement result to cause the artificial neural network to learn;
a fifth step of determining a third image data in which standards for normal or defect are set and classified feeding back of the second judgment result; and
a sixth step of comparing the first image data for each region of the lithium secondary battery to be inspected with the third image data to determine whether the lithium secondary battery to be inspected is normal or defective.

2. The inspection method of claim 1, wherein:
the plurality of surfaces comprises an upper surface, one side surface, and a lower surface of a cylindrical, prismatic, or pouch-type lithium secondary battery.

3. The inspection method of claim 2, wherein;
the upper surface of the lithium secondary battery is divided into a first region where a dent defect occurs, a second region where an electrolyte leakage defect and a washer defect occur, and a third region where an electrolyte input defect occurs, and
the first to third image data of the upper surface comprises image data selectively divided according to the first to third regions.

4. The inspection method of claim 3, wherein:
the second to fourth steps are performed in parallel or sequentially for each of the upper surface, the lower surface and the one side surface of the lithium secondary battery.

5. The inspection method of claim 4, wherein:
the second to fourth steps are performed by the one or more types of defects for each divided region, and
the artificial neural network determines the third image data in which standards for normal or detective with respect to the one or more divided regions are set and classified, based on the learning results for the one or more types of defects.

6. The inspection method of claim 2, wherein:
the lower surface of the lithium secondary battery is a fourth region in which a dent defect occurs, a scratch defect occurs, a sink defect occurs, and a surface contamination occurs, and
the first to third image data of the lower surface comprises image data selectively divided according to the fourth region.

7. The inspection method of claim 6, wherein:
the second to fourth steps are performed in parallel or sequentially for each of the upper surface, the lower surface and the one side surface of the lithium secondary battery.

8. The inspection method of claim 7, wherein:
the second to fourth steps are performed by the one or more types of defects for each divided region, and
the artificial neural network determines the third image data in which standards for normal or detective with respect to the one or more divided regions are set and classified, based on the learning results for the one or more types of defects.

9. The inspection method of claim 2, wherein:
the one side surface of the lithium secondary battery is divided into a fifth region in which a dent defect occurs and a sixth region in which a double washer defect occurs, and the first to third image data of the one side surface comprises image data selectively divided according to the fifth and sixth regions.

10. The inspection method of claim 9, wherein:
the second to fourth steps are performed in parallel or sequentially for each of the upper surface, the lower surface and the one side surface of the lithium secondary battery.

11. The inspection method of claim 10, wherein:
the second to fourth steps are performed by the one or more types of defects for each divided region, and
the artificial neural network determines the third image data in which standards for normal or detective with respect to the one or more divided regions are set and classified, based on the learning results for the one or more types of defects.

12. The inspection method of claim 2, wherein:
the second to fourth steps are performed in parallel or sequentially for each of the upper surface, the lower surface and the one side surface of the lithium secondary battery.

13. The inspection method of claim 12, wherein:
the second to fourth steps are performed by the one or more types of defects for each divided region, and
the artificial neural network determines the third image data in which standards for normal or detective with respect to the one or more divided regions are set and classified, based on the learning results for the one or more types of defects.

* * * * *